Jan. 20, 1970    M. S. COOK    3,491,343
APPARATUS FOR METHODS OF CONVERTING HOLOGRAPHIC RADIANT
ENERGY PATTERNS INTO VIBRATORY WAVES
Filed Jan. 27, 1967

INVENTOR.
MELVIN SEYMOUR COOK
BY
OSTROLENK, FABER, GERB & SOFFEN
ATTORNEYS

United States Patent Office 3,491,343
Patented Jan. 20, 1970

3,491,343
APPARATUS FOR METHODS OF CONVERTING HOLOGRAPHIC RADIANT ENERGY PATTERNS INTO VIBRATORY WAVES
Melvin Seymour Cook, Kings Park, N.Y., assignor to Holobeam, Inc., Paramus, N.J., a corporation of Delaware
Filed Jan. 27, 1967, Ser. No. 612,271
Claims priority, application Great Britain, Jan. 29, 1966, 4,081/66
Int. Cl. G11b 11/00; G03b 27/00
U.S. Cl. 340—173
19 Claims

ABSTRACT OF THE DISCLOSURE

Beaming of radiant energy, such as light, toward a photo-conductive insulating layer of material coated on a vibratory diaphragm and placing diaphragm in electric potential field to create uniform electrostatic charge pattern on insulating layer; beaming light, diffracted by object to be scanned, on insulating layer causing holographic pattern of light on insulating layer, which makes layer conductive in that pattern; conducting charge away from conductive areas of layer; removing light source; and varying intensity of electric potential field, whereby the characteristic electrostatic pattern causes vibration of diaphragm characteristic of the specific electrostatic pattern.

---

Figure 1:
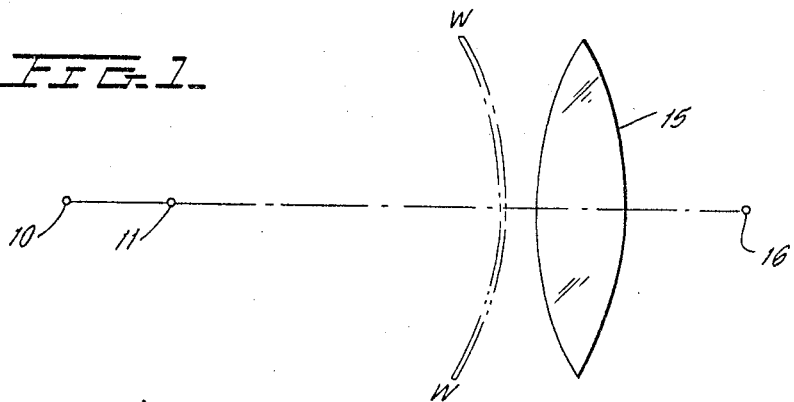

This invention relates to apparatus for and methods of converting radiant energy patterns into vibratory waves, such as sound waves.

It is well known that the formation of an optical image by a single lens may be regarded as a double diffraction process in which light incident upon an object to be scanned is diffracted by the object, and then is diffracted again at the lens. During the initial diffraction, the light beams striking different points of the object being scanned are scattered in a pattern characteristic of the object being scanned and have their phases altered with respect to each other. Interference patterns are formed in the wave front of radiant energy after it has scanned the object. Mathematically, the double diffraction process under well-known approximations is equivalent to two successive Fourier transformations, starting with the object and arriving at it again at the end of the second transformation. It is also known that under certain conditions, it is possible to separate the two diffraction processes, recording the first created diffraction pattern on a photographic plate or other transparency and employing this record as the diffracting object for incident radiation such as light, for example, in the second stage of the process. The recorded first created pattern will be in a halographic pattern and is known in the art as a hologram.

As a rule, important information is lost in the two-stage process because the intermediate transparency, although well adapted for recording wave-amplitude information, does not adequately capture the phase data of the incident radiation. However, it was pointed out by Gabor [D. Gabor, Proc. Roy. Soc. (London) A917, p. 454 (1949); B64, p. 449 (1951)] that when the scattered radiation from an object is attended by a coherent and intense background radiation, the phase of the resultant is always approximately that of the known background. In such a case, little information of importance is lost, and the second stage of the process leads to a tolerably faithful image of the object.

In order to obtain interference fringes of good contrast in a hologram, the radiation emanating from the source must be monochromatic, as the presence of different wavelengths would generate different overlapping interference fringe patterns.

The recorded interference fringes must be well defined to ensure a high quality hologram. This requires the reference radiation to have a high degree of spatial and temporal coherence, and for this reason, a laser radiation source is now most commonly used as a source for the reference beam and to illuminate the object.

The exposure time required to form a holographic record in a recording means varies with the size of the object being scanned and with the intensity of the radiation source. The use of a recording device with a good response and, possibly, with gain at the frequency of the incident radiation tends to reduce the required exposure time. If a high-power pulsed laser radiation source is used, the length of the pulse itself can be used to set the exposure time. Holographic records on photographic plates of large moving objects have been successfully made using a mode-controlled giant pulse laser radiation source where the laser pulse length was of the order of 30 nanoseconds and the laser utilized incorporated a mode selection feature to improve the spatial and temporal coherence of the laser radiation. If a continuously operating laser radiation source is utilized, it may be necessary to incorporate some device, such as a shutter, which can be opened and shut in order to establish the exposure time.

The radiation source can be used to illuminate either the entire object or successive points on the object, thereby to "scan" it.

The interference of two wavefronts of the same curvature to form a holographic record is called Fourier-transform holography, whereas if the interfering wavefronts are of different curvatures, the process is called Fresnel-transform holography.

When the scattered radiation has the same center of curvature as the background radiation, the fringes localized on the photographic plate will be relatively insensitive to small vibrations of the photographic plate. When a large and complicated object is used, then the information recorded on the photographic plate appears as a complicated pattern of interference fringes. When, on the other hand, a small and simple object is used, the pattern is less complicated. If a point scatterer is used as the object, circular fringes will be recorded on the photographic plate. This effect allows a large information storage in a small physical space, such as in an alkali halide crystal, for example.

Every holographic record is uniquely characteristic of the object from which it is made. If holographic records are made of simple two-dimensional objects, such as simple point configurations, or single alphabetic letters, the holographic record produced in each case is characteristic of the object. Even casual inspection reveals that the interference fringes forming such holographic records are strikingly analogous in density to the amplitude distribution of vibration patterns of vibrating diaphragms, or other devices which are producing sounds. This similarity is made use of in the present invention.

According to the present invention, a recording means, comprised of a recording layer, is provided. A uniform beam of electromagnetic radiation is beamed on the recording layer to form thereon a uniform pattern of particles, which may comprise a uniform charge patern. Then, a radiant energy pattern significant of an object is formed in the pattern of particles or the charge pattern, e.g., by scanning the object with a portion of an electromagnetic wave emanating from a source of radiant energy. The recording layer of the recording means records an interference pattern after some of the incident radiation has been affected by scanning the object. The recording layer forms a charge pattern in itself which corresponds to the interference pattern of the radiation incident upon it, the interference pattern deriving from interaction between radiation coming from the object and coming from the source without interacting with the object.

The recording layer is comprised of an insulating material that is electrically conductive when the radiation is incident upon it. Alternatively, the recording layer might be comprised of a material that is magnetically conductive when the radiation is incident upon it. The recording layer would then be adapted to record a corresponding pattern of magnetic dipoles within itself.

Preferably, the radiant energy pattern created by the scanning of the object by electromagnetic waves is in the form of a holographic pattern. The recording layer would then advantageously comprise a photoconductive insulating layer. The recording layer may be formed on the diaphragm.

The recording means is initimately connected with a vibratory member, such as a diaphragm. A diaphragm has a set of vibratory mode patterns; and if the vibrations to be produced by the diaphragm are in the audible range, the vibratory mode patterns of the diaphragm produce acoustical vibrations.

To obtain vibration of the diaphragm, the invention contemplates that an electric or a magnetic field will be generated in the vicinity of the recording layer. This field will be varied rapidly in intensity, e.g. from a high to a low electric potential. This serves to act upon the patterned electrostatic field or the patterned magnetic dipoles in the recording layer. The change in the field acting upon the holographic pattern which was previously formed in the recording layer causes changes in the forces exerted on the diaphragm.

The change in the forces exerted on the recorded pattern in the recording layer when the electromagnetic field is changed will in general have components which will act on each of the set of mode patterns for the vibrations of the diaphragm. Each member of the set of mode patterns will receive an effective disturbing force which depends upon the recorded pattern formed and upon both the change of the intensity and rate of change of the field acting upon the entire holographic pattern.

If the field changes rapidly, the vibrations of the diaphragm will be effectively rich in frequency content in the region of frequencies in which it is desirable to obtain a vibratory response in the diaphragm, e.g., in the acoustical region audible to humans.

The result will be that each recorded pattern will be associated with a composite vibratory wave or sound characteristic of that pattern produced when the diaphragm is set into mechanical motion. The composite vibratory wave will be shaped by the vibration characteristics of the diaphragm, as it is affected by the various interference patterns recorded on the recording layer.

If a diaphragm, or other device, is disturbed with a force distribution proportional to the density of a record of an object, and if the disturbed diaphragm generates a sound sufficiently rich in frequencies, the sound will give information about the object although much information inherent in the record will be lost. However, sufficient information is retained in such sound for certain purposes and applications to which the invention addresses itself.

Accordingly, it is the object of the present invention to provide a method for converting a pattern of radiant energy into vibratory waves.

It is another object of the present invention to provide a method for converting radiant energy patterns into audible acoustic waves.

It is another object of the present invention to provide a method for converting radiant energy patterns created when radiant energy strikes an object into vibratory waves which are uniquely characteristic of the object upon which the radiant energy patterns were formed.

It is a further object of the present invention to provide apparatus for performing the methods of the present invention.

Figure 2:
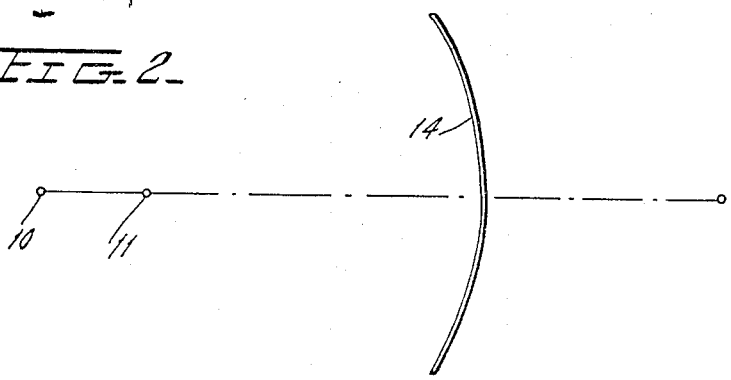
Figure 3:
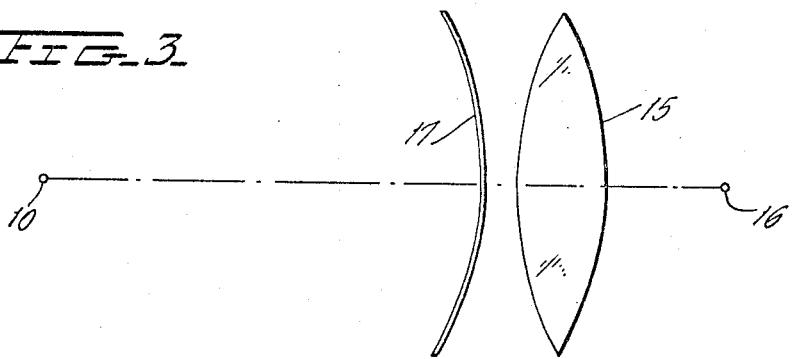
Figure 4:
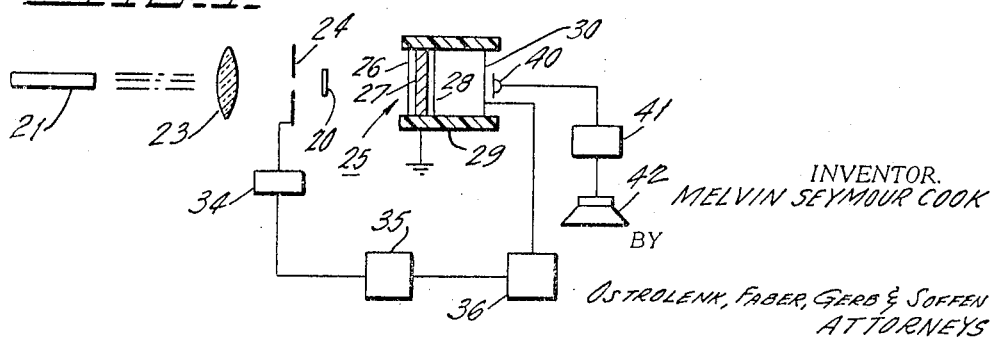

These and other objects of the present invention will become apparent when the following description is read in conjunction with the accompanying drawings, in which:

FIGURE 1 schematically illustrates the formation of a holographic pattern;

FIGURE 2 schematically illustrates the formation of a holographic pattern on a photographic plate or transparency;

FIGURE 3 schematically illustrates the projection of an image on a holographic plate or transparency to create anew an image of the object being scanned;

FIGURE 4 is a schematic diagram of one embodiment of apparatus according to the invention.

Referring to the figures, FIGURE 1 shows a point source 10 of radiant energy which might be a laser beam, producing monochromatic radiation in a manner well known in the art, and forming spherical wave surfaces WW centered at 10. The wave amplitude possesses a common value and the wave is in a single phase over each spherical surface WW. If a point object 11 capable of scattering or diffracting the radiating energy from source 10 is installed at 11, the wave amplitude will no longer be uniform over WW, but will be at each point a vector sum of the primary radiation from 10 and the scattered radiation from 11. If a photographic plate, transparency, or film, or other recording means 14 is placed at WW (see FIGURE 2), the radiant energy pattern can be recorded thereon in terms of photographic density. The finished transparency is called a hologram although the term is not reserved to negatives of spherical contour, or to photographic records.

Referring again to FIGURE 1, if the hologram of FIGURE 2 is removed and a converging lens 15 is so positioned that object 11 is between lens 15 and energy source 10, then lens 15 will form a real image of object 11 at point 16. The same radiant energy, such as light, which had produced the holographic pattern on the photographic film 14 in FIGURE 2, at WW in FIGURE 1 has been picked up by the lens 15 and synthesized into an image.

Alternatively, a real image of object 11 may be produced if the negative hologram is contact-printed to produce a transparent positive 17, which is then installed in the position and with the curvature of the waves WW as shown in FIGURE 3. The object 11 is removed from the system. Now the radiation from source 10 which passes through the positive hologram 17, and reaches the lens 15, is very much like that which formerly struck the lens 15 and gave rise to the image. The lens, therefore, produces an image of object 11 as before, even though the object itself is no longer present.

In accordance with one embodiment of the invention, a holographic record, instead of being formed on a photographic element, is formed as a pattern of greater or lesser electrostatic charge density upon a vibratory member or diaphragm; and in the embodiment shown in FIGURE 4, this is achieved by forming the actual holographic record as a pattern of electrostatic charge upon a photoconductive insulating layer mounted on or adjacent a vibratory member or diaphragm.

In FIGURE 4, an object 20 to be studied is illuminated with radiation from a laser 21. The radiation from the laser 21 passes through a lens 23 which brings the radiation to a focus in the vicinity of the shutter 24 and the object 20. The radiation passing through and around the object 20 falls on a diaphragm 25. The laser 21 can be a gas, liquid, or solid state laser known in the art and may be operated in pulsed fashion, or may be operated continuously, in which case the shutter 24 may be used to interrupt the passage of radiation to the diaphragm 25.

In this embodiment, the diaphragm 25 forms the recording device and replaces the photographic plate described with reference to FIGURE 2.

A recording is made of the same information that would appear upon a photographic hologram as optical density, but this information is recorded as an electrostatic charge pattern of greater or lesser electrostatic charge on a light responsive photoconductive insulating layer 28 on the diaphragm 25. It would also be possible to record the information in question as a pattern of magnetic dipoles in a magnetically retentive material or surface on the diaphragm.

The diaphragm 25 consists of a thin, flexible, vibratory, transparent plastic sheet 26 which may be comprised of a material designated in the trade as Mylar. The sheet 26 has a layer 27 of suitable electrically conductive material, such as gold, deposited upon it, on top of which is coated a photoconductive insulating layer 28 comprised, e.g., of any photoconductive vitreous selenium, anthracene, sulfur, a selenium and tellurium mixture, or the like, or a photoconductive pigment-binder layer, such as a phosphor or similar photoactive material in an insulating binder. Suitable photoactive materials include the sulfides, oxides, and selenides of calcium, zinc, cadmium, and the like, as well as other materials recognized in the art as being conductively activated by the action of light or other activating radiation.

Alternatively, the diaphragm can be comprised of a thin paper sheet, or other material having the desired electrical conductive properties. The intrinsic conductivity of such materials precludes the necessity of providing an overlay of a conductive material, such as gold. No matter which arrangement is chosen, for the best functioning of the invention, the material on which the photoconductive insulating layer is deposited should have an electrical conductivity equal to or greater than the electrical conductivity of the photoconductive insulating layer when the latter is conductively activated by light or other activating radiation.

To be capable of accepting an electrostatic charge, the photoconductive insulating layer 28 upon the diaphragm 25 should be comprised of a material having a resistivity in the dark, i.e., when no radiation is striking it, substantially greater than the resistivity of the combination of the gold layer 27 and the thin Mylar sheet 26. The material of which the insulating layer 28 is comprised should be such that when it is exposed to radiation of the sort used in connection with this invention, the resistivity of the photoconductive insulating layer 28 should decrease significantly and approach the resistivity of the combination of the gold layer 27 and the thin Mylar sheet 26. The material of the photoconductive insulating layer used in connection with the present invention preferably has a resistivity of the order of $10^{14}$ to $10^{15}$ ohm–cm.$^2$ when no radiation strikes it and it is in the "dark," and a resistivity of the order of $10^{10}$ to $10^{12}$ ohm–cm.$^2$, as radiant energy is being beamed onto it. These values are merely illustrative of certain ranges that can be encountered, and the concepts involved in forming an electrostatic charge pattern on a photoconductive insulating layer on a conductive material or materials have been extensively explored in the art known as xerography.

The diaphragm 25 can, as described above, be of one-piece construction, or it can be composed of several segments such that each may vibrate independently when disturbed.

Instead of a single layer of photoconductive insulating material as described above, a multilayer construction may be used to increase the efficiency.

Diaphragm 25 is supported in support frame 29, which is schematically illustrated in FIGURE 4 as being comprised of a simple hollow tube of insulating material in which diaphragm 25 is secured. A tensioning means (not shown) is provided on the support frame 29 to place diaphragm 25 under sufficient tension so that it will behave like a stretched membrane and vibrate in various characteristic patterns.

Separated from the diaphragm 25 by a distance of the order of ⅛ of an inch, or less, and supported within the same support frame 29 as supports diaphragm 25, there is an electrode 30. Electrical connections are separately provided for the diaphragm 25 and the electrode 30.

In the embodiment shown in FIGURE 4, an electrostatic charge pattern is formed on the diaphragm 25 in the following manner: The photoconductive insulating layer 28 on the diaphragm 25 is not initially charged. The electrode 30 is maintained at a high negative potential by voltage unit 36.

While the electrode is maintained at a high potential, the photoconductive insulating layer 28 is uniformly exposed to light. At this stage, no object, such as object 20, has been placed to intercept the light shining on the layer 28. The light shining on layer 28 renders it uniformly conductive and enables a uniform electrostatic charge to be formed over the entire layer 28. Positive charge migrates to the surface of the photoconductive insulating layer facing the negatively charged electrode 30 through the gold layer 27, which is in contact with a lower potential, or ground potential. Negative charge migrates from the photoconductive insulating layer through the gold layer to the lower, or ground potential. The light source, or laser 21, is then shut off, causing the layer 28 to become an insulating layer having a uniform electrostatic charge thereon. Then the voltage unit 36 is grounded, eliminating the high potential field surrounding the layer 28.

While the above recites that the electrostatic charge pattern was formed by applying a negative potential to the electrode 30, an electrostatic charge pattern may also be formed by applying a positive potential to the electrode 30, in which case negative charge will migrate to the surface of the photoconductive insulating layer 28 facing electrode 30, while positive charge will migrate to ground potential.

For the first time, the object 20 to be scanned is placed in front of shutter 24. The laser 21 then scans the object. Diffraction of the light occurs, and a holographic pattern of light passes through the diaphragm 25 and through layer 27 and falls on layer 28. Because of the diffraction, the pattern of illumination on layer 28 is holographic, and is not uniform. The areas of the photoconductive insulating layer 28 which are illuminated by the holographic light pattern become electric conductors. The more intense the illumination of an area of layer 28, the better the electric conductor it becomes. Conversely, the less intensely illuminated an area is, the more insulative it remains.

The electrostatic charge on the conductive areas of the layer 28 is conducted to ground through the conductive layer 27. The more conductive an area of the layer 28 becomes while a holographic pattern of light is being shined upon it, the greater the amount of the electrostatic charge that is conducted away from that area of the layer 28 to ground.

The laser which provides the light being beamed upon the layer 28 should shine for only a very short period so that only the more illuminated areas of the layer 28 will be able to discharge nearly all their charge to ground. If the laser 21 were to be beamed for too long a period, the more illuminated areas would have discharged entirely in a short period, and the less illuminated areas would have had sufficient time to also discharge entirely, whereby the remaining charge pattern would not accurately mirror the holographic light pattern.

A characteristic pattern of electrostatic charge has now been formed in the layer 28. This pattern corresponds to the holographic pattern of light diffracted as a result of its scanning the object 20.

The charge pattern on the layer 28 can be changed into a vibratory wave by causing the diaphragm 25 to vibrate.

To cause mechanical vibration of the diaphragm 25, an electrical potential is applied to the electrode 30 by voltage unit 36. The potential is built up to a high level, and then the electrode 30 is grounded.

There are certain advantages in allowing the voltage, which has been applied to the electrode 30 by the voltage unit 36 after the electrostatic charge pattern has formed on the diaphragm 25, to discharge to ground potential rapidly. This is most easily accomplished by connecting electrode 30 to ground, whereby the potential of the electric field in the vicinity of diaphragm 25 can drop off rapidly.

Suppose the voltage applied to the electrode 30 were expressed by the function:

$$V(t) = \begin{cases} A, \text{ for } t<0 \\ A(1-e^{-\alpha t}), \text{ for } t<0, \end{cases}$$

where $\alpha$ represents a positive real constant, $t$ represents time, and A is the amplitude of the voltage initially applied to the electrode 30 by the voltage unit 36 after an electrostatic charge pattern has been developed on diaphragm 25. To find the effective frequency distribution of the varying electric field acting on diaphragm 25, the Fourier transform of V($t$) is considered below:

$$P(f) = \int_{\infty}^{\infty} V(t)e^{-j2\pi ft}dt$$
$$= \{(\alpha)^2 + (2\pi f)^2\}^{-1/2}e\{-j \tan^{-1}(2\pi f/\alpha)\}$$

In the above, $j$ is the square root of negative unity, and $f$ is frequency measured in cycles per unit of time. It can be seen from this result that if the voltage function V($t$) decays rapidly to zero potential or ground potential, the effective frequency distribution of the varying electric field acting on the diaphragm will have contributions over the range of sound frequencies which are audible to the human ear. The forces affecting the diaphragm 25 due to the action of the electric field on the electrostatic charge pattern already formed on said diaphragm will reduce in magnitude with the decrease in the electric field intensity as the voltage on the electrode 30 drops towards ground potential. The resulting release of tension on the diaphragm 25 will set it into vibration in a pattern characteristic of the electrostatic charge pattern on the diaphragm. The pattern is characteristic since the initial forces on different regions of said diaphragm were proportional to the density of the electrostatic charge in these regions.

Although the embodiment just described has a photoconductive insulating layer on a flexible diaphragm, it is equally possible to utilize a rigid plate comprised of a photoconductive insulating layer coated on a transparent conductive support base, e.g., a sheet of tin oxide-coated glass, so that exposure may be made through the transparent plate. In this case, a flexible conductive diaphragm without a photoconductive insulating layer would be supported adjacent, but slightly separated from the photoconductive insulating layer coated on the rigid plate.

With the rigid plate embodiment, when an electrostatic charge pattern is to be formed on the photoconductive insulating layer on the plate, a potential of opposite polarity to that of the electrostatic charge pattern to be formed on the plate is first applied to the diaphragm. When the plate is exposed to radiation, as with the first described embodiment, charges will migrate through the conductive backing of the plate to the surface of the illuminated regions of the photoconductive insulating layer on the plate. If the flexible diaphragm is then grounded, it will be set into a vibration pattern characteristic of the electrostatic charge pattern on the plate.

Other arrangements may be used for forming the electrostatic charge pattern upon the diaphragm. For example, a hologram produced on a phosphor screen, or other radiation or light sensitive device, may be scanned by a device which generates an electron beam that can directly deposit an electrostatic charge pattern on a diaphragm. The pattern deposited would correspond in electrostatic charge density to the density of light or other radiation on the phosphor screen, or light sensitive device. The hologram on the radiation, or light sensitive device, could be scanned in accordance with the techniques used in known television systems, for example, in which an electron beam produces an electron charge pattern corresponding, point-by-point, with the light intensity seen by the camera. Such an arrangement can give gain and magnification to the pattern initially formed on the phosphor screen, or light sensitive device, and can increase the speed of operation. It can also change the frequency response of the characteristic vibration or sound to be produced by the diaphragm in the operation of the invention.

In any of the embodiments described above, and as shown in FIGURE 4, the vibratory or sound waves generated by the vibrating diaphragm 25 are detected by a microphone, or transducing means 40 and are fed via an amplifier 41 to a loudspeaker 42. This comprises a sound transmitting means. In this arrangement, the diaphragm and microphone may be enclosed in an acoustically insulated housing (not shown).

In certain applications, it may be possible to directly use the vibrations of the diaphragm as a signal source by allowing the sounds arising from these vibrations to be accessible to the user of the device. Where a microphone is used, an amplified signal could be used to drive a remote speaker. Electrical signals produced by the microphone, or other transducing means, could be used to feed information about some object to a reader, or to a computer, or could be used for control or analysis purposes.

Although the invention has been described in terms of producing an interference pattern on the vibratory member, any pattern of radiation significant of an object or of information can be used to generate a pattern of charge on the member.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Apparatus for converting radiant energy patterns into vibratory waves comprising,
   a source of radiant energy and
   a recording means for receiving the radiant energy from said source and converting it into vibratory waves;
   said recording means comprising a recording layer and a vibratory member;
   said recording layer having a plurality of areas and being comprised of a material which is oriented in a first charge pattern while it is not being struck by radiant energy from said source and which is oriented in a second charge pattern at all of said areas where said layer is struck by radiant energy from said source; said material being such that the greater the intensity of the radiant energy striking any of said areas on said recording layer, the more that area on said recording layer is oriented toward the second charge pattern;
   said vibratory member being adjacent said recording layer;
   a means for placing said recording means in a radiant energy field of a first intensity; the intensity of said radiant energy field being varied, whereby the charge patterns on said recording layer cause said vibratory member to vibrate.

2. The apparatus of claim 1, wherein
   said recording means comprises an electrically conductive layer disposed between said vibratory member and said recording layer; said conductive layer being connected to a first electric potential;

said recording layer being adapted to orient itself in various electrostatic charge patterns; said first and said second charge patterns being electrostatic charge patterns;

said means for placing said recording means in a radiant energy field comprising an electrode connected to an electrical potential source which is at a second potential.

3. The apparatus of claim 2, wherein said recording layer, said conductive layer and said vibratory member comprise an integral structure.

4. The apparatus of claim 2, in which said conductive layer is connected to a ground potential;

said potential source which is connected to said electrode being adapted to be energized and de-energized, whereby the intensity of the electric field in which said recording means is positioned can be varied to cause vibration of said vibratory member.

5. The apparatus of claim 4, wherein said recording layer is positioned between said electrode and said vibratory member, and said vibratory member is positioned between said recording layer and said source of radiant energy;

said vibratory member being permeable by the radiant energy emanating from said source.

6. The apparatus of claim 4, wherein said recording layer has a first electrical conductivity in the areas thereof on which radiant energy is beamed;

said conductive layer has an electrical conductivity at least equal to said first electrical conductivity;

said recording layer having a first resistivity in the the areas thereof upon which no radiant energy is being beamed;

said conductive layer and said vibratory member having a second resistivity; said first resistivity being substantially greater than said second resistivity;

said recording layer having a third resistivity in the areas thereof upon which radiant energy is beamed; said third resistivity being approximately equal to said second resistivity.

7. The apparatus of claim 2, wherein the source of radiant energy comprises a source of light;

said recording layer comprising a photoconductive insulating layer; said photoconductive layer being adapted to reorient itself into said second electrostatic charge pattern at all said areas where said recording layer is exposed to light.

8. The apparatus of claim 7, wherein said recording layer is comprised of a substance selected from the following group of photoconductive substances:

vitreous selenium, anthracene, sulfur, a mixture of selenium and tellurium, or one of the sulfides, oxides, or selenides of calcium, zinc or cadmium.

9. The apparatus of claim 8, wherein said electrically conductive layer is comprised of gold.

10. The apparatus of claim 9, wherein said recording layer has a first electrical conductivity in the areas thereof on which radiant energy is beamed;

said conductive layer has an electrical conductivity at least equal to said first electrical conductivity;

said recording layer having a first resistivity in the areas thereof upon which no radiant energy is being beamed;

said conductive layer and said vibratory member having a second resistivity; said first resistivity being substantially greater than said second resistivity;

said recording layer having a third resistivity in the areas thereof upon which radiant energy is beamed; said third resistivity being approximately equal to said second resistivity.

11. The apparatus of claim 10, wherein said recording layer, said conductive layer and said vibratory member comprise an integral structure;

said conductive layer is connected to a ground potential;

said potential source which is connected to said electrode being adapted to be energized and de-energized, whereby the intensity of the electric field in which said recording means is positioned can be varied to cause vibration of said vibratory member;

said recording layer is positioned between said electrode and said vibratory member, and said vibratory member is positioned between said recording layer and said source of radiant energy;

said vibratory member being permeable by the radiant energy emanating from said source.

12. In combination, the apparatus of claim 1 and a vibratory wave transmission means;

said transmission means comprising an amplification means and a speaker means.

13. In combination, the apparatus of claim 11 and a vibratory wave transmission means;

said transmission means comprising an amplification means and a speaker means.

14. A method for converting radiant energy patterns into vibratory waves, comprising the steps of:

providing a recording means comprised of a recording layer, which recording layer has a charge pattern thereon which is altered when radiant energy is beamed onto it;

beaming patterned radiant energy onto the recording means to cause the charge pattern to be altered in a pattern characteristic of the radiant energy pattern being beamed onto it;

ceasing the beaming of radiant energy;

and placing the recording means in a radiant energy field and varying the intensity of the radiant energy field, whereby the altered charge pattern causes a vibratory member adjacent the recording layer to vibrate.

15. The method for converting radiant energy patterns into vibratory waves of claim 14, comprising:

the additional initial steps of placing the recording means in a radiant energy field and, simultaneously beaming a source of uniform radiant energy onto the recording means to cause the recording layer to assume the charge pattern.

16. The method of claim 14, wherein the radiant energy beamed is light; the recording layer is photoconductive, whereby the charge pattern is electrostatic; and the radiant energy field is an electric potential field.

17. The method of claim 14, wherein the radiant energy beamed is light; the recording layer is photoconductive, whereby the charge patterns are electrostatic; and the radiant energy field is an electric potential field.

18. The method of claim 15 comprising the additional step of transmitting the vibrations of the vibratory member.

19. Apparatus for converting radiant energy patterns into vibratory waves comprising, a source of radiant energy and a recording means for receiving the radiant energy from said source and converting it into vibratory waves;

said recording means comprising a recording layer and a vibratory member;

said recording layer having a plurality of areas and being comprised of a material having particles which are oriented in a first pattern while said recording layer is not being struck by radiant energy from said source; said particles being oriented in a second pattern at all of said areas where said layer is struck by radiant energy from said source; said material being such that the greater the intensity of the radiant energy striking any of said areas on said recording layer, the more each of those said areas on said recording layer is oriented toward the second particle pattern;

said vibratory member being adjacent said recording layer;

a means for placing said recording means in a radiant energy field of a first intensity; the intensity of said radiant energy field being varied, whereby the particle patterns on said recording layer cause said vibratory member to vibrate.

References Cited

UNITED STATES PATENTS

| | | | |
|---|---|---|---|
| 3,083,615 | 4/1963 | El-Sum | 355—2 |
| 3,124,635 | 3/1964 | Jones et al. | 84—1.18 |
| 3,177,470 | 4/1965 | Galopin | 340—146.3 |
| 3,197,543 | 7/1965 | Williams | 84—1.18 X |
| 3,372,245 | 3/1968 | Yoshida et al. | 179—111 |
| 3,378,645 | 4/1968 | Heller | 346—74 X |

BERNARD KONICK, Primary Examiner

JOSEPH F. BREIMAYER, Assistant Examiner

U.S. Cl. X.R.

84—1.18; 179—111; 355—2